Jan 6, 1931. D. SLOTSKY 1,787,705
ADVERTISING DEVICE
Filed Aug. 10, 1929  5 Sheets-Sheet 1
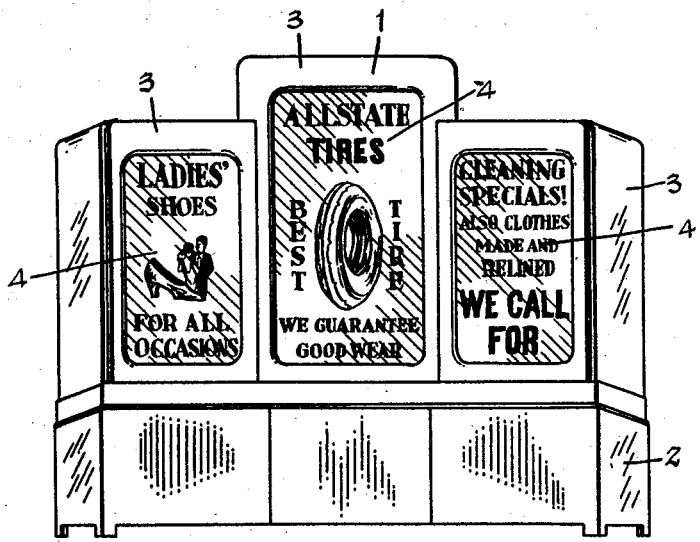
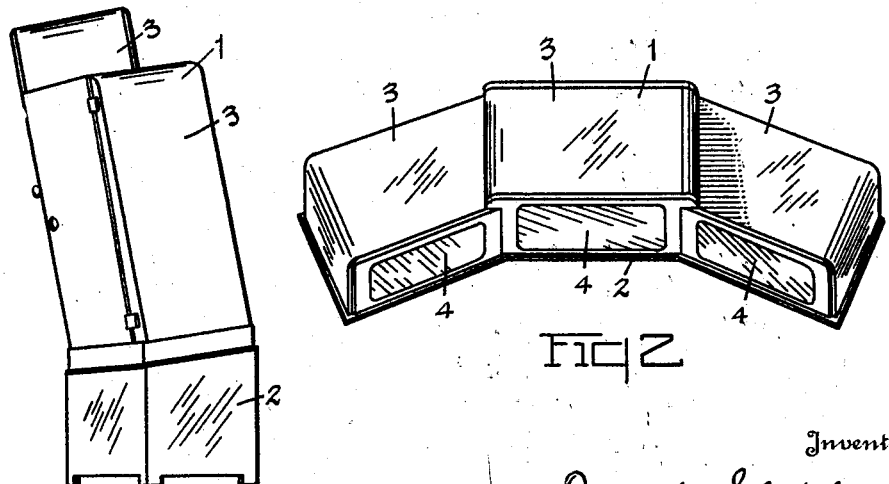
Inventor
David Slotsky

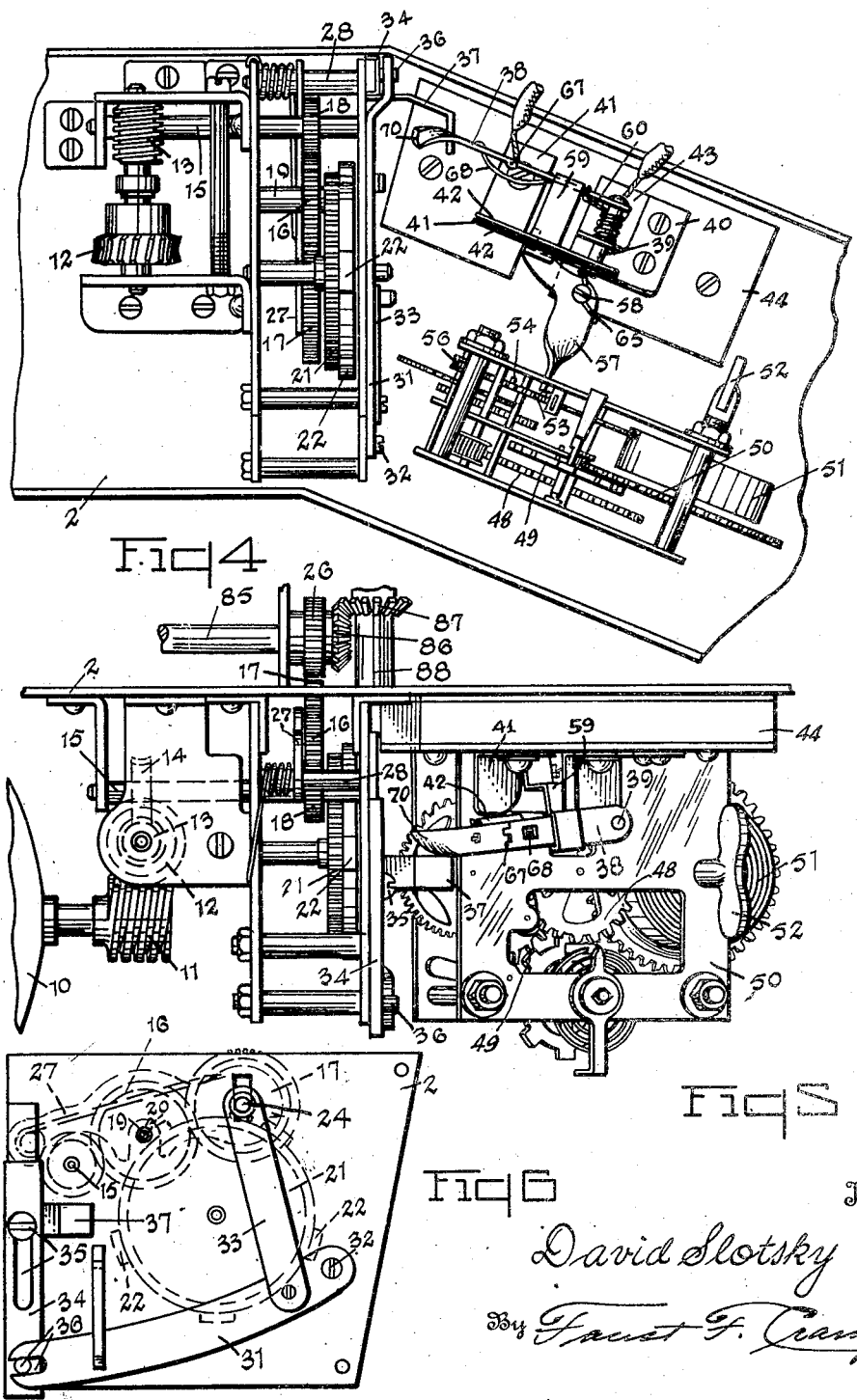

Jan. 6, 1931.     D. SLOTSKY     1,787,705
ADVERTISING DEVICE
Filed Aug. 10, 1929    5 Sheets-Sheet 3
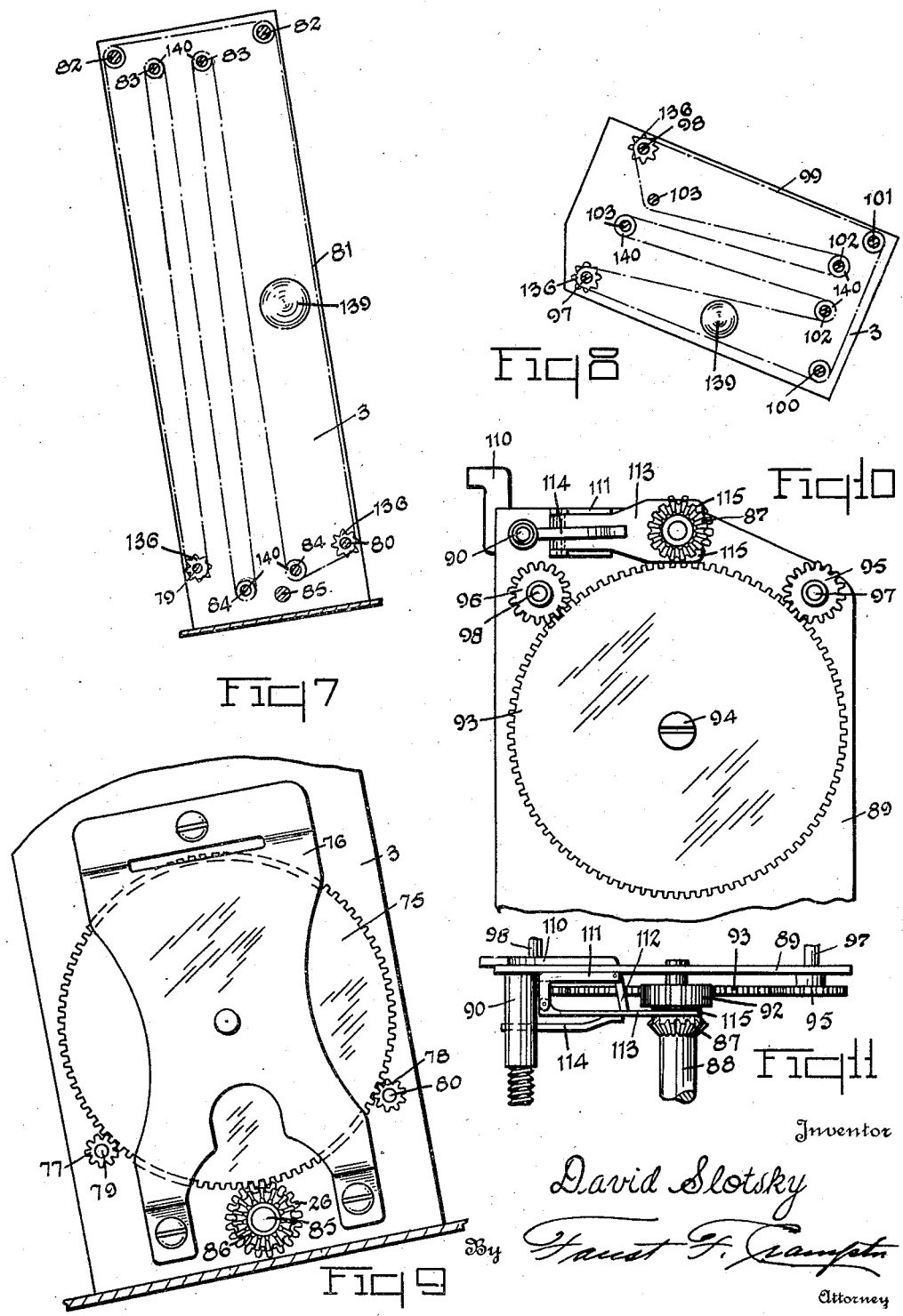
Inventor
David Slotsky
By Faust F. Crampton
Attorney Jan 6, 1931.                D. SLOTSKY                1,787,705
                          ADVERTISING DEVICE
                   Filed Aug. 10, 1929    5 Sheets-Sheet 4
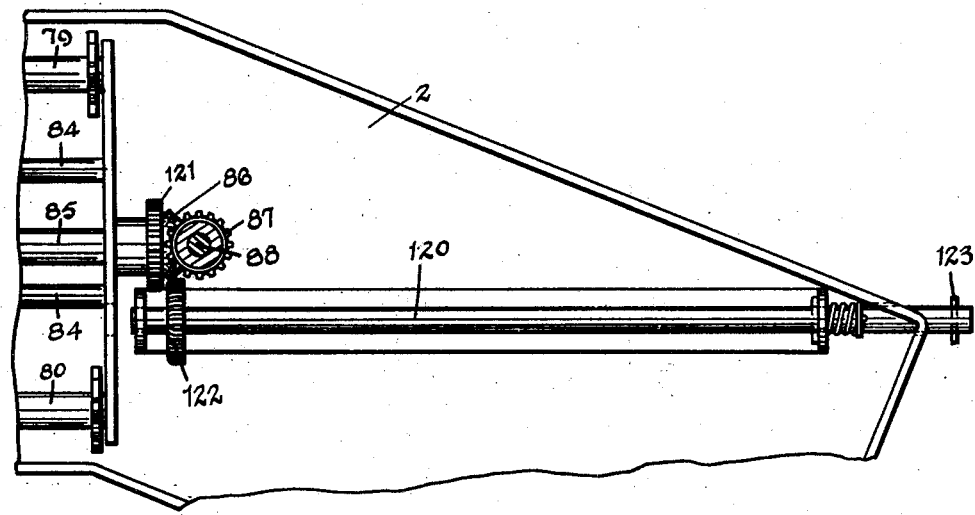
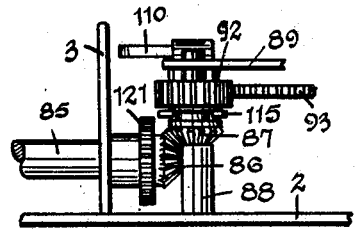
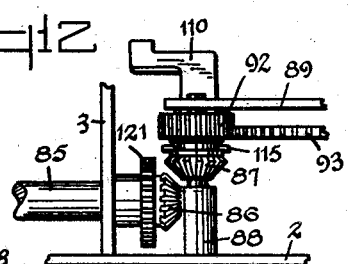
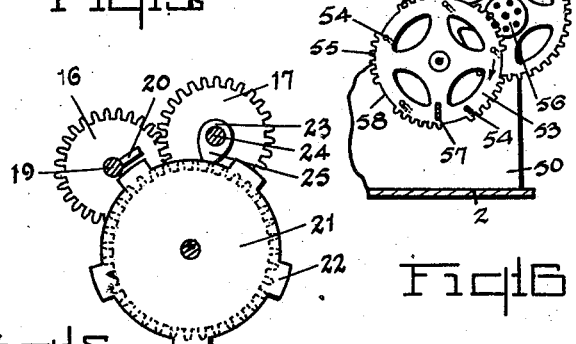
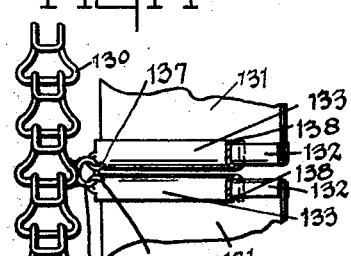
Inventor
David Slotsky
By Faust F. Crampton
        Attorney Jan 6, 1931.  D. SLOTSKY  1,787,705
ADVERTISING DEVICE
Filed Aug. 10, 1929   5 Sheets-Sheet 5

Inventor
David Slotsky
By *[signature]*
Attorney

Patented Jan. 6, 1931

1,787,705

UNITED STATES PATENT OFFICE

DAVID SLOTSKY, OF CLEVELAND, OHIO

ADVERTISING DEVICE

Application filed August 10, 1929. Serial No. 384,819.

My invention has for its object to provide an efficient mechanism for operating a changeable sign. The invention particularly relates to the inter-control of a timing mechanism and a motor that operates the sign-changing mechanism, whereby the advertising material may be displayed during definite periods. Preferably, the advertising device has a plurality of sign changing parts, any number of which may be connected to the motor control and clock mechanism. Also the invention relates to means for manually changing the signs either collectively or individually to bring about a definite relation in the displayed portions of each part of the advertising device. The invention consists in other features and advantages which will appear upon the examination of the drawings and from the following description of the device.

The invention may be contained in advertising devices of different forms and, to illustrate a practical application of the invention, I have selected an advertising device as an example of the various embodiments of my invention and shall describe it hereinafter. The particular structure selected for purposes of illustration of an embodiment of my invention is shown in the accompanying drawings.

Figure 17:
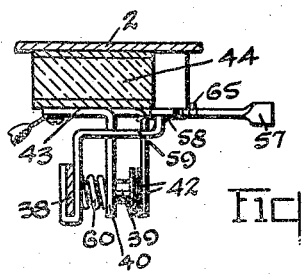
Figure 20:
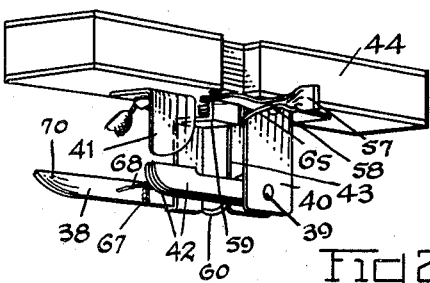
Figure 21:
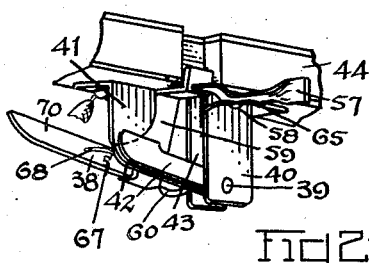
Figure 19:
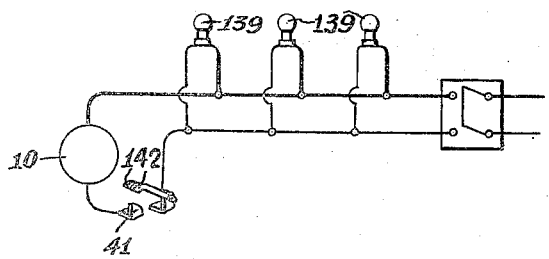

Fig. 1 is a view of the front of the device. Fig. 2 is a view of the top. Fig. 3 is a view of the side of the device. Fig. 4 is a view of the bottom of the device when the device is in an inverted position, and illustrates parts of the control mechanism. Fig. 5 is a side view of the control mechanism shown in Fig. 4. Fig. 6 is a detail view of a part of the mechanism. Figs. 7 and 8 are views illustrating the location of the ribbons carrying the printed material. Fig. 9 is a view of a part of the operating mechanism located above the control mechanism shown in Figs. 4 and 5. Fig. 10 is a view of the bottom, when inverted, of another part of the operating mechanism. Fig. 11 is a detail view of parts shown in Fig. 10. Fig. 12 is a view of one end of the machine and shows a means for manually operating the mechanism. Fig. 13 is a detail view of one of the interconnecting trains of gear wheels. Fig. 14 is a view illustrating a means for disconnecting the gears shown in Fig. 13. Fig. 15 is a detail view of parts shown in Fig. 6. Fig. 16 is a detail view of parts shown in Fig. 5. Fig. 17 is a view in detail of parts shown in Fig. 4. Fig. 18 is a view illustrating a means for securing the printed material to the operating chains of the device. Fig. 19 is a diagrammatic view of the electric connections of the device. Fig. 20 is a view in perspective of certain of the operating parts when in one position. Fig. 21 is a view in perspective of the parts when moved to another position.

The mechanism, in the form of construction shown in the drawings, is enclosed in a cabinet 1 having a base 2 and, preferably, three interconnected shells 3 supported on the base 2. The shells 3 are provided with suitable transparent panels 4 through which advertising material located on strips is exposed, the strips being operated periodically for changing the exposed portions thereof to change the advertising material that is displayed.

The actuating mechanism is located within the base 2 and is connected to the strip operating mechanism by suitable driven members. The actuating mechanism is driven by means of a motor 10 having, preferably, a worm 11 that operates on a worm gear wheel 12. To further reduce the rate of rotation of parts of the mechanism, the worm wheel 12 is connected to a worm wheel 13, which drives the worm wheel 14. The worm wheel 14 is located on the shaft 15 which drives a train of gear wheels 16 and 17 through the gear wheel 18. The shaft 19 on which the gear wheel 16 is located is provided with a single tooth 20 which operates on a large gear wheel 21 to cause step by step movements of the gear wheel 21. The gear wheel 21 is provided with a plurality of lugs 22 that operate on an eccentric 23 which is located on the shaft 24 to which the gear wheel 17 is connected. The eccentric 23 is provided with a cam part 25 that is engaged by the lugs 22 to raise the gear wheel 17 to cause it to mesh periodically with the gear wheel 26. The gear wheel 17 is supported on an arm 27 that is pivotally supported on a pin 28 that is connected to the base 2. The pin 28 is located in proximity to the shaft 15 to prevent demeshing of the gear wheel 17 from the gear wheel 16 when it is raised.

The raising of the shaft 24 is, however, not sufficient to cause disconnection of the pinion 20 with the teeth of the gear wheel 21 but is sufficient to make connection between the gear wheel 17 and the gear wheel 26. Thus, when the motor starts, the first operation is to connect the gear wheels 16 and 26 to cause rotation of the gear wheel 26. When, however, the lugs 22 have completely passed the cam 25, the gear wheel 17 is disconnected from the gear wheel 26 which prevents any movement of the gear wheel 26 after the lugs 22 pass the cam 25. Thus the gear wheel 26 is moved a predetermined distance dependent on the width of the lugs 22, and is independent of the inertia of the motor.

In the rotation of the gear wheel 21, as the lugs 22 pass the eccentric 23 and the shaft 24 is raised, an arm 31, which is pivotally connected to a part of the base by means of the pin 32, is raised, it being connected to one end of the shaft 24 by means of a link 33. A slide 34 is supported on the base 2 by means of a pin and slot connection 35 that permits slidable movements of the slide 34. The end of the slide 34 is connected to the end of the arm 31 by means of the pin and slot connection 36.

The slide 34 has a finger 37, and a jointed arm 38, connected to a shaft 39, is deflected to one side by the finger 37. The shaft 39 is pivotally supported in a frame 40 that is connected to a plate of insulation material 44 secured to the top wall of the base 2. A contact 41 is also supported on the plate 44, and the shaft 39 is provided with a pair of spring contacts 42 that are adapted to engage on opposite sides of the contact 41 to electrically connect the contacts. The source of supply of current is connected to a contact 43 which surrounds and is in frictional contact with the shaft 39 while the electric motor is connected to the contact 41 and, consequently, the circuit of the motor may be completed through the contacts 41 and 43 by the spring contacts 42.

A clock mechanism 50 is located within the base 2. The clock mechanism is actuated by a spring 51 that may be wound by a suitable key, such as the key 52. It has the usual reducing gear 48, including an escapement 49, for reducing the speed of a gear wheel 53 that is operated by the chain of reducing gears 48 of the clock while its teeth are in mesh. The gear wheel 53 is a mutilated gear having a plurality of sets of teeth 55. The sets are located in spaced relation with respect to each other around the periphery of the gear wheel. The gear wheel 53 has a plurality of pins 54 that are located in proximity to the leading tooth of each set of teeth with respect to the direction of rotation of the gear wheel 53. When, therefore, each set of teeth 55 leaves the pinion 56 that meshes with the teeth 55 and is in the following gear reducing chain 48 of the clock, the urge of the spring 51 produces a momentum in the gear wheel 53 and this energy is utilized for operating a trip lever 57 by means of a pin 54 which moves the trip lever 57 about the pin 58, which is supported on a part of the base 2. The momentum causes one of the pins 54 to immediately strike the trip lever 57. When the lever 57 is operated, it draws its end from engagement of a finger 59 that is connected to the lever 38, which permits the lever 38 to rise under the pressure of the spring 60, which is connected to the contact 43 and to the lever 38, to close the circuit. The end of the lever 57 will be held against the side of the finger 59 by the spring 65 until the arm 38 has been engaged by the arm 37. The compression of the spring 65 will then cause the end of the lever 57 to move past the end of the finger 59 and maintain the switch open.

To open the circuit of the motor, the lug 22 which engages the eccentric 23 eventually passes from beneath the eccentric and permits the shaft 24 to lower, which lowers the gear wheel 17 and, consequently, disconnects the gear wheel 17 from the gear wheel 26. The lever 31 is also lowered, which permits the slide 34 to descend and the finger 37 to engage the lever 38 and open the contacts 41 and 43. This opens the circuit of the motor 10 and the motor stops. Meanwhile, a succeeding set of teeth 55 on the gear wheel 53 meshes with the pinion 56 while the movement of the gear wheel 53 is under the control of the delaying mechanism of the clock.

The clock continues to operate the gear wheel 53 through the set of teeth 55 that engages the pinion 56, until the said set of teeth passes the pinion 56, whereupon the succeeding lug 54 engages the lever 57, which again permits the switch to close by the operation of the spring 60, since the lever 57 again moves from above the finger 59 of the lever 38. This again starts the motor which again raises the gear wheel 17 into mesh with the gear wheel 26 and at the same time raises the slide 34 and the finger 37 above the arm 38 into position to again engage the arm 38 to open the switch when the slide 34 descends. These operations repeat continuously. The motor operates periodically as determined by the clock mechanism and for a period of time as determined by the movement of the gear wheel 21. The lever 38 has a knife blade joint 67 and a spring 68 that operates to maintain the jointed lever 38 in its wide open position. When the finger 37 is raised, it engages a cam surface 70 that moves the end part of the lever 38 to one side against the yielding resistance of the spring 68 so that the finger 37, during its upward movement, will not disturb the position of the arm 38. At the completion of the operation period, the finger 37 is again moved downward, engaging the arm 38 and thus opening the circuit between the contacts 41 and 42.

The gear wheel 26 is located above the base 2 and within the central shell 3. The pinion 26 meshes with a gear wheel 75 that is rotatably supported on one of the side walls of the central shell 3 and in a bracket 76 that is connected to the side wall. The gear wheel 75 operates a pair of pinions 77 and 78 located on shafts 79 and 80 that are also supported in the side walls of the central shell 3. A ribbon 81 is driven by the shafts 79 and 80. The ribbon passes over the shafts and over a plurality of shafts 82 that are located in the upper corners of the central shell 3. The shaft 80 is located in proximity to the front wall of the central shell 3, and the shaft 80 coacts with one of the shafts 82 to locate the ribbon 81 in close proximity to the transparent panel 4 of that shell. Printing material may be located in spaced portions of the ribbon 81, and the motor operates to place said portions or areas of the strip in position such that it may be viewed through the transparent panel. The length of the advertising sections corresponds to the arcuate distance across the surface of the lugs 22 of the gear wheel 21. The motor is thus operated for a period of time sufficient to cause, periodically, changes in the advertising material that is displayed by moving the ribbon the required distances in each operation of the motor.

The ribbon is a continuous ribbon and extends over a plurality of shafts 83 located between the shafts 82, and also over a plurality of shafts 84 located between the shafts 79 and 80. This provides for a ribbon of considerable length that may have thereon a large number of display areas that may be from time to time exposed to the transparent panel 4 of the central shell 3.

The gear wheel 26 is connected to a shaft 85 that is rotatably supported on the top of the base 2 by the walls of the central shell 3. The shaft 85 at opposite ends is provided with bevel gear wheels 86 which operate on bevel gear wheels 87 located in each of the outer shells 3. The bevel gear wheels 87 are rotatably supported on the fixed shafts 88, which are secured to the top wall of the base 2, and the plates 89, which are secured by means of the posts 90 to the base wall 2. The pinions 92 are connected to the bevel gear wheels 87 and drive the gear wheels 93 which are rotatably supported on the pins 94 that are connected to the plates 89. Each gear wheel 93 operates on the pinions 95 and 96 to cause rotation of the shafts 97 and 98. A ribbon 99 is moved by the rotation of the shafts 97 and 98 over the shafts 100 and 101.

The shafts 97 and 100 are so located as to dispose portions of the ribbon 99 in proximity to the panel 4 of each of the outer shells 3. The ribbon 99 extends over a plurality of shafts 102, located intermediate the shafts 100 and 101 and a plurality of shafts 103 located intermediate the shafts 97 and 98 whereby a long ribbon may be used for containing a large number of areas having advertising matter, such areas being exposed intermittently by the succeeding operations of the motor 10. The gear wheels have dimensions such as to locate succeeding areas of the ribbons in position upon each succeeding period of operation of the motor.

The ribbon 81 of the central shell 3 is caused to move vertically while the ribbons 99 of the side shells are caused to move horizontally. This is for the purpose of producing an attractive changing effect as between the advertising material that is displayed. Preferably, the ribbons of the side shell move inwardly towards the ribbon of the central shell. This combination provides a means whereby interesting advertising effects may be produced by having correlated material on the strips which are displayed during each period.

If it is desired to discontinue the operation of either of the mechanisms contained in the side shells, it may be done by raising the finger member 110 which is pivoted to a bracket 111 located on the under side of the plate 89. The finger member 110 has a lug 112 that extends through an opening formed in the plate 89 and engages an arm 113 that is also pivoted on the bracket 111. The arm 113 is spring pressed by means of a spring 114 connected to one of the posts 90 to elastically press the arm 113 upward, except as it is resisted by the lug 112. When, however, the finger member 110 is raised, the lug 112 is moved so as to permit the arm 113 to be raised by the spring 114. The arm 113 is connected by a yoke 115 to the bevel gear 87 and the pinion 92. Raising the bevel gear wheel 87 disconnects it from the bevel gear wheel 86, and the operation of the mechanism in one of the side shells will thus be disconnected. The other side shell is provided with a similar disconnecting mechanism for disconnecting its bevel gear wheel 87 from the bevel gear wheel 86 located in the other shell by the operation of a finger member 110 also located in the other shell.

If it is desired to operate the mechanism by hand in place of the motor, such as when it is desired to change the signs of the different shells to some desired relation to each other, it may be done by connecting a shaft 120 with the gear wheel 121 by means of a gear wheel 122. The gear wheel 121 is connected to the shaft 85 so that when the shaft 120 is rotated the shafts that drive the ribbons in the shell will be rotated except where one or both of the mechanisms of the side shells are disconnected. The shaft 120 may protrude from the wall of the base 2 and be provided with a suitable pin 123 for connecting the shaft 120 with a suitable crank. Rotation of the crank will cause the rotation of the shaft 120 and provide for resetting of the ribbons to desired points relative to each other.

The ribbons 81 and 99 are each preferably provided with a pair of chains 130 that are engaged by the sprocket wheels 136. The sprocket wheels that thus actuate the ribbons are located on the shafts 79, 80, 97, and 98, which are actuated by the motor 10. The sprocket wheels 136 operate to keep the chains 130 in a definite relation with respect to the gear wheel 21 and also to keep the chains taut as they pass the transparent panels 4 of the shells 3. The portions of the chains in the central parts of each of the shells may have a considerable slack while the portions of the chains extending along the walls of the shells are held taut to maintain the display sections of the ribbon in a taut condition so that the advertising material will be clearly displayed through the transparent panel. Preferably, the chains pass over the flanged rollers 140 located on the shafts 83 and 84 and shafts 102 and 103.

The sections of the ribbon are preferably formed of sheet material having shown thereon the desired material that is to be periodically disclosed through the transparent panels. Preferably removable sections of sheet material are used whereby the advertising material may be readily changed from time to time. The sheets 131 are secured within U-shaped metal strips 132 that fit into and are engaged by the U-shaped members 133. The U-shaped strips 133 are formed larger than the U-shaped strips 132 and the U-shaped strips 133 have inturned edges 138 that engage the edges of the strips 132. Thus the sheets may be inserted in position by sliding the U-shaped strips 132 within the U-shaped strips 133 by an endwise movement. The U-shaped strips 133 are provided with rings 137 which are connected to the outer corners of the U-shaped strips 133 with respect to the centers of the sheets 131. Rings 135 interconnect the rings 137 and the rings 135 are secured by any suitable means, such as by soldering, to links of the chains 130. The rings 135 and 137 allow free movement of the ribbons over the shafts 79, 80, 82, 83, and 84, and also over the shafts 97, 98, 100, 101, 102, and 103. The links 135 are spaced along the chains 130 according to the length of the sheets 131 which is in turn determined by the length of the surface of the lugs 22 of the gear wheel 21, and the interconnecting mechanism between each pair of chains and the gear wheel 21. Since the motor drives all of the chains, the chains of the side shells 3 are reduced in their movement, as compared to the movement of the chains in the central shell, by the interconnecting mechanism. This is required since the width of the sheets that move transversely in the side shells are much shorter than the length of the sheets in the central shell that moves vertically.

Suitable bulbs may be located within the shells in proximity to the transparent panels and so as to illuminate the exposed areas. Preferably, the sheet material on which the advertising material is placed is formed of a semi-transparent or of a translucent material which will permit illumination of the advertising material by light passing through the sheets. The bulbs 139 are preferably long and narrow so that the more intense light will be distributed across a large portion of the width of the sheets and so that the heat produced thereby will not injure the sheet material that forms the advertising sections of the ribbons.

I claim:

1. In an advertising device, an electric motor, a clock mechanism having an escapement, a gear wheel operated by the motor, a ribbon having a plurality of display sections, means for interconnecting the ribbon with the said gear wheel for moving the said ribbon in accordance with the movements of the said gear wheel, a switch for controlling the motor, and means operated by the gear wheel for opening the said switch to stop the motor, a gear wheel operated by the clock mechanism, means for disconnecting the said second gear wheel from the escapement of the clock mechanism for permitting free movement of the said second gear wheel relative to the clock mechanism, a lever for operating the said switch and connected to the said second gear wheel controlled by the clock mechanism for operating the said switch when the second gear wheel is disconnected from the said escapement.

2. In an advertising device, an electric motor, a clock mechanism, a gear wheel driven by the motor, a switch, means operated by the gear wheel for opening the switch, and means operated by the clock mechanism for closing the switch, a ribbon having advertising material located on sections thereof, a mechanism operated by the gear wheel for shifting the said ribbon, and means operated by the said gear wheel for disconnecting the said mechanism from the gear wheel to prevent movement of the ribbon by the motor after the said mechanism has been moved a predetermined distance by the motor and the gear wheel.

3. In an advertising device, a pair of chains, means for operating the chains, a plurality of sheets having advertising material thereon, each sheet having U-shaped metal parts secured to the ends of the sheets, a plurality of pairs of metal U-members for containing the U-members connected to the sheets, said second U-members having edges protruding over the edges of the first-named U-members whereby the sheets may be connected or disconnected from said second named U-members by sliding the first named U-members endwise within the first named U-members, the said second U-members having interconnecting rings for connecting the said second U-members to the chains.

In witness whereof I have hereunto signed my name to this specification.

DAVID SLOTSKY.